(12) United States Patent
Pfeiffer

(10) Patent No.: US 11,787,491 B2
(45) Date of Patent: Oct. 17, 2023

(54) CONTROL DEVICE

(71) Applicant: Wolf Tooth Components, LLC, Burnsville, MN (US)

(72) Inventor: Michael W. Pfeiffer, Eden Prairie, MN (US)

(73) Assignee: Wolf Tooth Components, LLC, Burnsville, MN (US)

( * ) Notice: Subject to any disclaimer, the term of this patent is extended or adjusted under 35 U.S.C. 154(b) by 0 days.

(21) Appl. No.: 17/589,861

(22) Filed: Jan. 31, 2022

(65) Prior Publication Data
US 2022/0242510 A1    Aug. 4, 2022

Related U.S. Application Data

(60) Provisional application No. 63/143,772, filed on Jan. 29, 2021.

(51) Int. Cl.
*B62J 1/28* (2006.01)
*G05G 1/04* (2006.01)

(52) U.S. Cl.
CPC . *B62J 1/28* (2013.01); *G05G 1/04* (2013.01)

(58) Field of Classification Search
None
See application file for complete search history.

(56) References Cited

U.S. PATENT DOCUMENTS

| 4,325,267 A | 4/1982 | Kojima |
| 5,149,034 A | 9/1992 | Ganaja |
| 5,493,933 A | 2/1996 | Kelly |
| 5,588,331 A | 12/1996 | Huang et al. |
| 5,701,786 A | 12/1997 | Kawakami |
| 5,791,195 A | 8/1998 | Campagnolo |
| 5,860,326 A | 1/1999 | Lussier |
| 5,881,602 A | 3/1999 | Cirami |
| 6,264,224 B1 | 7/2001 | Phillips |
| 6,767,024 B1 * | 7/2004 | Kuo ............. B62K 25/08 280/275 |
| 6,792,826 B2 | 9/2004 | Dal Pra' |
| 6,862,948 B1 | 3/2005 | Calendrille, Jr. |
| 7,841,258 B2 | 11/2010 | Cesur et al. |
| 7,878,089 B2 | 2/2011 | McLaughlin et al. |
| 8,061,667 B2 | 11/2011 | Weiss |
| 8,490,995 B2 | 7/2013 | Hunt et al. |
| 8,833,200 B2 | 9/2014 | Hunt et al. |
| 9,073,596 B2 | 7/2015 | McLaughlin et al. |
| 9,126,650 B2 | 9/2015 | Dal Pra' et al. |

(Continued)

OTHER PUBLICATIONS

Cunningham, Pinkbike, OneUp Componenets' Travel-Adjustable Dropper Post—First Ride, Apr. 18, 2018, retrieved from the Internet at: <https://www.pinkbike.com/news/oneup-components-travel-adjustable-dropper-post-first-look.html>, 8 pages.

(Continued)

*Primary Examiner* — Vicky A Johnson
(74) *Attorney, Agent, or Firm* — Dicke, Billig & Czaja, PLLC

(57) ABSTRACT

A control device includes an actuation lever, a bearing mounted in the actuation lever, an axle extended through the bearing, and a base supported by the axle, whereby the actuation lever is rotatably coupled with the base, via the bearing and the axle, for rotation relative to the base.

29 Claims, 11 Drawing Sheets

(56) References Cited

U.S. PATENT DOCUMENTS

| | | | |
|---|---|---|---|
| 9,221,433 B2 | 12/2015 | Dunlap | |
| 9,533,571 B1 | 1/2017 | Urmosi | |
| 10,473,143 B2* | 11/2019 | Basiliere | F16C 1/12 |
| 2006/0096404 A1 | 5/2006 | Wessel | |
| 2007/0137387 A1 | 6/2007 | Dal Pra | |
| 2007/0261508 A1 | 11/2007 | Acenbrak | |
| 2008/0202277 A1 | 8/2008 | Miki | |
| 2008/0282830 A1* | 11/2008 | Hara | B62K 23/06 74/489 |
| 2009/0158881 A1 | 6/2009 | Shahana | |
| 2010/0139442 A1 | 6/2010 | Tsumiyama | |
| 2011/0138961 A1 | 6/2011 | Dal Pra' | |
| 2011/0204201 A1* | 8/2011 | Kodama | B62J 1/08 248/404 |
| 2013/0220062 A1 | 8/2013 | Valle | |
| 2014/0083826 A1 | 3/2014 | Greenberg et al. | |
| 2014/0137696 A1 | 5/2014 | Kosaka | |
| 2016/0272270 A1 | 9/2016 | Miki | |

OTHER PUBLICATIONS

OneUp Components, Dropper Post Remote, Oct. 24, 2018, retrieved from the Internet at: <https://www.oneupcomponents.com/products/dropper-post-lever>, 3 pages.

* cited by examiner

CONTROL DEVICE

CROSS-REFERENCE TO RELATED APPLICATIONS

This application claims priority under 35 U.S.C. 119(e) to U.S. Provisional Patent Application Ser. No. 63/143,772 filed on Jan. 29, 2021, and incorporated herein by reference. In this instance, the day that is 12 months after the filing date of the provisional application falls on a Saturday (i.e., Saturday, Jan. 29, 2022). As such, the period of pendency of the provisional application is extended to the next succeeding business day (i.e., Monday, Jan. 31, 2022). See 35 U.S.C. 119(e)(3).

BACKGROUND

The present disclosure relates generally to a control device and, more specifically, relates to a control device for actuating a height adjustment device for a saddle of a bicycle.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
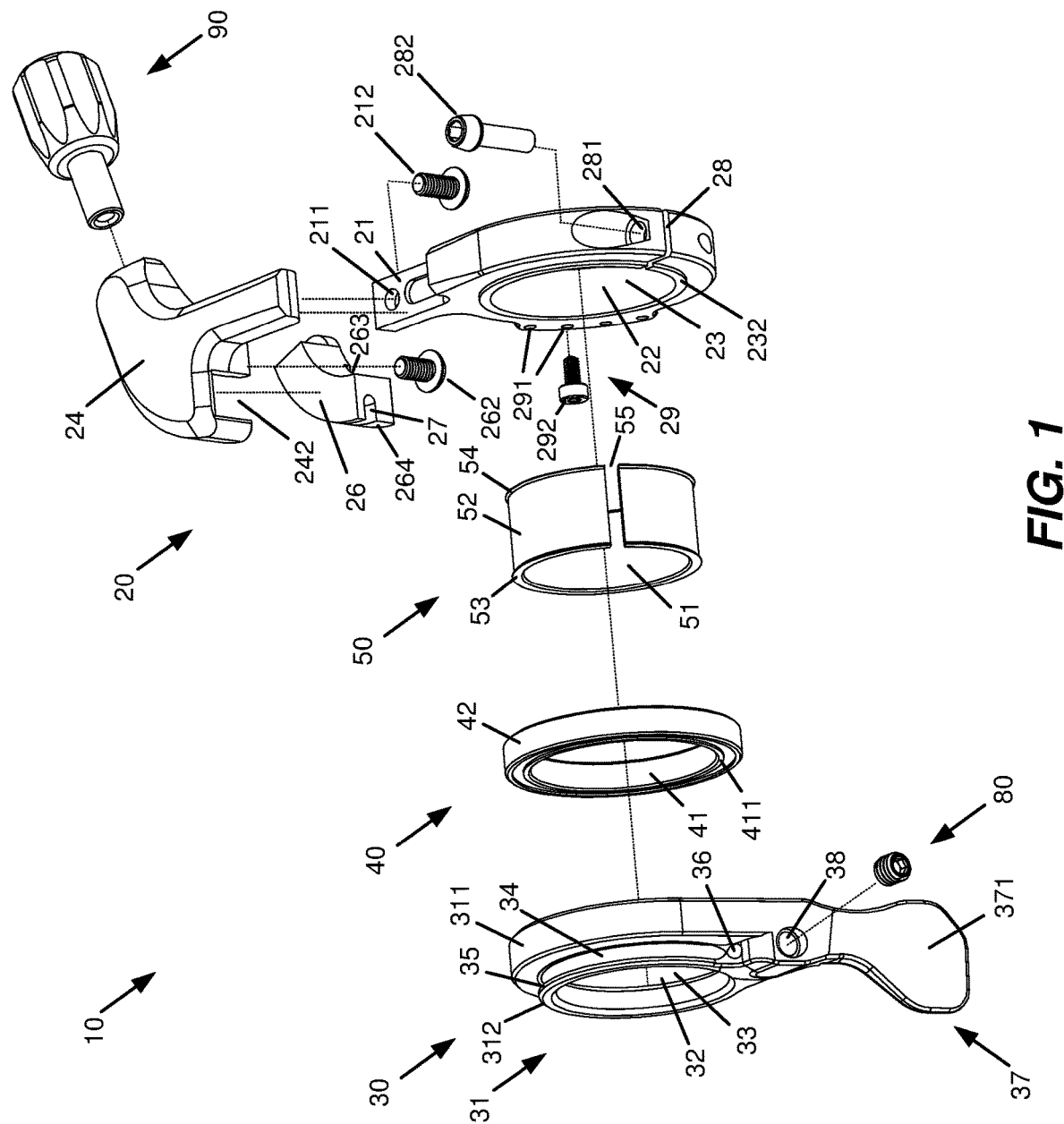
FIG. 1 is an exploded top perspective view of an example of a control device in accordance with the present disclosure.
Figure 2:
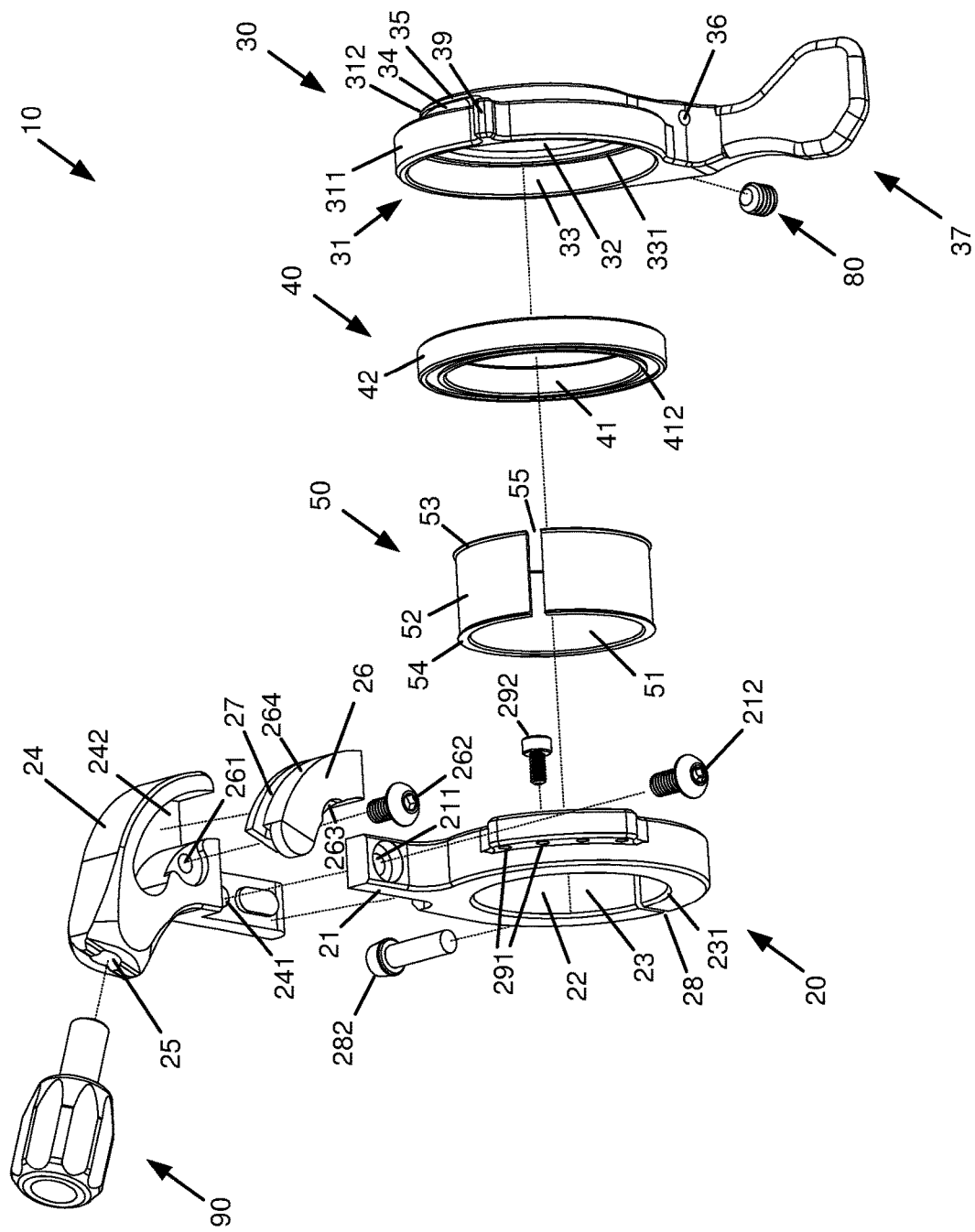
FIG. 2 is an exploded bottom perspective view of an example of the control device of FIG. 1.

FIG. 1 is an exploded top perspective view of an example of a control device 10 in accordance with the present disclosure, and FIG. 2 is an exploded bottom perspective view of an example of control device 10. In one example, control device 10 includes a body or base 20, an actuation lever 30, a bearing 40, and an axle 50. As described herein, bearing 40 is mounted in actuation lever 30, and axle 50 is extended into or through base 20 and through bearing 40, such that base 20 and actuation lever 30 (via bearing 40) are supported by axle 50. In one implementation, bearing 40 is a rolling-element bearing such as a ball bearing.

In the illustrated example, base 20 has a hole 22 therethrough, actuation lever 30 includes a body portion 31 having a hole 32 therethrough and a lever portion 37 extended from body portion 31, bearing 40 includes an inner race 41 and an outer race 42, and axle 50 has an inner diameter surface 51 and an outer diameter surface 52. In addition, axle 50 is of a generally cylindrical shape, for example, a generally cylindrical sleeve or bushing, and includes flanges 53, 54 at opposite ends. In one implementation, axle 50 is a tension bushing or spring tension bushing including, in one example, a split tension bushing with a split 55 formed along a length thereof. Although illustrated as being a linear split, split 55 may be of different shapes or forms, such as stepped, sinusoidal, or other non-linear complementary shaped pattern or patterns.

In one implementation, body portion 31 of actuation lever 30 is of a ring or annular shape and includes a bearing receiving or supporting portion 311 (i.e., bearing seat), and bearing 40 is mounted (e.g., press fit) within hole 32 of body portion 31 within bearing receiving or supporting portion 311 such that outer race 42 of bearing 40 contacts an inner diameter surface 33 of body portion 31 (with, in one implementation, inner diameter surface 33 of body portion 31 including a lip 331 as a seat for bearing 40). In addition, axle 50, namely, a portion or one end thereof, is extended through bearing 40 such that outer diameter surface 52 of axle 50 contacts inner race 41 of bearing 40 and flange 53 of axle 50 contacts a face of bearing 40 including, more specifically, face 411 of inner race 41 of bearing 40 whereby bearing 40 is supported by or on axle 50. Furthermore, axle 50, namely, an opposite portion or opposite end thereof, is extended into or through base 20 such that outer diameter surface 52 of axle 50 contacts an inner diameter surface 23 of base 20 whereby base 20 is supported by or on axle 50 (with, in one implementation, inner diameter surface 23 of base 20 including a chamfered edge 231 as a seat for flange 54 of axle 50). As such, actuation lever 30 (with bearing 40) and base 20 are both supported by or on axle 50 (with, in one implementation, inner diameter surface 23 of base 20 including a stepped or raised edge 232 which contacts an opposite face of bearing 40 including, more specifically, opposite face 412 of inner race 41 of bearing 40) such that actuation lever 30 is rotatably coupled with base 20, via bearing 40 and axle 50, for rotation relative to base 20.

In one implementation, body portion 31 of actuation lever 30 has a cable channel or cable groove 34 formed in an outer diameter surface 35 thereof and has a cable passage 36 formed therethrough adjacent an end of cable channel or cable groove 34. In one implementation, outer diameter surface 35 of body portion 31 is formed by a stepped or reduced diameter portion 312 of body portion 31 formed laterally of bearing receiving or supporting portion 311 of body portion 31 such that a radius or diameter of stepped or reduced diameter portion 312 (as a cable receiving or supporting portion of body portion 31) is less than a radius or diameter of bearing receiving or supporting portion 311 of body portion 31. As such, a radius or diameter of cable channel or cable groove 34 is less than a radius or outside diameter of bearing 40.

In addition, in one implementation, a cable guide 24 having a cable passage 25 formed therethrough extends from base 20 such that an actuation or control cable may be fed through cable passage 25 and cable guide 24, and routed along cable channel or cable groove 34 and into or through cable passage 36 of actuation lever 30. In one implementation, a set screw 80 is threaded into a threaded hole 38 of actuation lever 30 and tightened to capture and secure an end portion of an actuation or control cable fed into or through cable passage 36. In one example, a barrel adjuster 90 is threaded into cable passage 25 of cable guide 24 such that tension on an actuation or control cable passing through cable passage 25 and cable guide 24 (and secured to actuation lever 30 by set screw 80) may be adjusted.

In the illustrated example, cable guide 24 is formed separate from and secured (e.g., coupled or affixed) to base 20. In one implementation, cable guide 24 is secured to an extension or arm 21 extending from base 20 by a screw 212 inserted through a hole 211 in arm 21 and threaded into a threaded hole 241 of cable guide 24. In one implementation, cable guide 24 includes a cable guide insert 26 fit within a pocket 242 of cable guide 24. In one example, cable guide insert 26 is secured within pocket 242 by a screw 262 threaded into a threaded hole 261 of cable guide 24. In one implementation, a head of screw 262 catches cable guide insert 26 (e.g., partially overlaps an edge of cable guide insert 26, such as inner curved or radial edge 263 of cable guide insert 26) to secure cable guide insert 26 within pocket 242.

In one implementation, cable guide 24, with cable guide insert 26, routes an actuation or control cable through a bend or curved path. In one implementation, cable guide insert 26 has a cable channel or cable groove 27 formed in an outer curved or radial surface 264 thereof such that an actuation or control cable fed through cable passage 25 and cable guide 24 may be routed through cable guide insert 26 along and through cable channel or cable groove 27. In one implementation, cable guide insert 26 is formed of a material selected to reduce or minimize friction of sliding movement of an actuation or control cable routed through cable channel or cable groove 27. In one example, cable guide insert 26 is formed of a metal such as, for example, bronze, or a polymer material, such an acetyl polymer.

In one implementation, base 20 includes a ring or annular shape and has a split 28 formed therethrough (e.g., through the ring or annular shape) such that the ring or annular shape is incomplete. As such, control device 10 may be secured (e.g., clamped) around a bar by radially compressing base 20. In one example, a pinch bolt or screw 282 is threaded into a threaded hole 281 extended across split 28 and tightened to secure (e.g., clamp) control device 10 around a bar. More specifically, pinch bolt or screw 282 may be tightened to radial compress base 20 (and axle 50 as fit within base 20) and clamp control device 10 around a bar, as further disclosed herein.

In one implementation, base 20 includes a clocking or rotational limit arrangement to establish a starting position including, more specifically, a rotational starting position of actuation lever 30. In one example, a rotational starting position of actuation lever 30 is established based on interaction (e.g., contact) of a protrusion 39 of actuation lever 30 and a stop 29 of base 20. In one implementation, protrusion 39 extends radially from body portion 31 of actuation lever 30 and stop 29 extends or protrudes from base 20 (e.g., a face of base 20) such that protrusion 39 of actuation lever 30 interacts with (e.g., contacts) stop 29 to establish a rotational limit (e.g., starting position) of actuation lever 30. In one example, stop 29 includes a screw 292 (or tab, pin, or other element or feature) extended or protruded from base 20. In one implementation, screw 292 may be positioned within (and moved between) a series of holes 291 (clocking position holes) formed in the face of base 20. As such, different rotational limits (e.g., different starting positions) of actuation lever 30 (and, therefore, different rotational actuation ranges of control device 10) may be established, as further disclosed herein.

Figure 3:
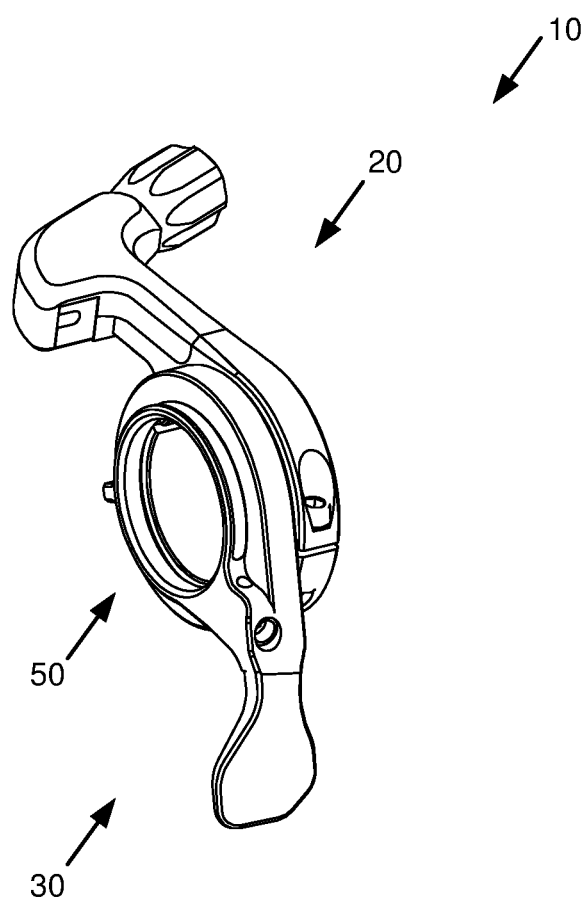
FIG. 3 is an assembled top perspective view of an example of the control device of FIG. 1.
Figure 4:
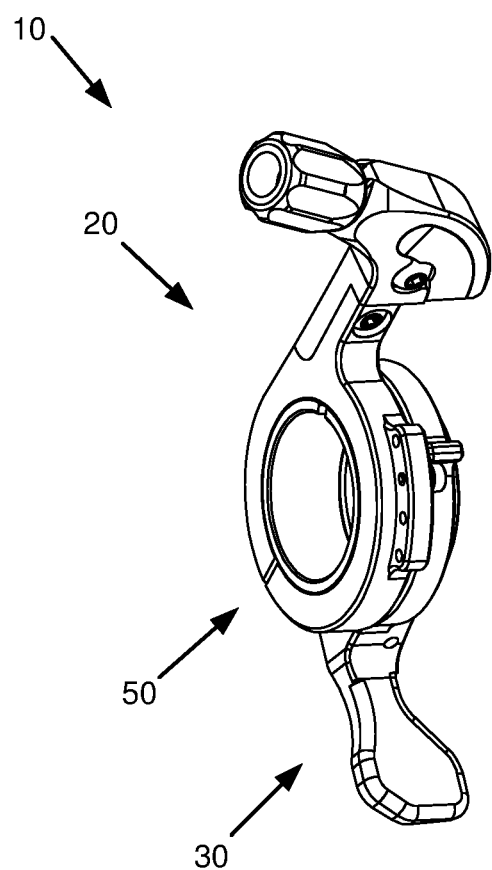
FIG. 4 is an assembled bottom perspective view of an example of the control device of FIG. 1.

FIG. 3 is an assembled top perspective view of an example of control device 10, and FIG. 4 is an assembled bottom perspective view of an example of control device 10. In one implementation, as further disclosed herein, actuation lever 30 (with bearing 40) and base 20 are both supported by or on axle 50 such that actuation lever 30 is rotatably coupled with base 20, via bearing 40 (FIGS. 1, 2) and axle 50, for rotation relative to base 20.

Figure 5A:
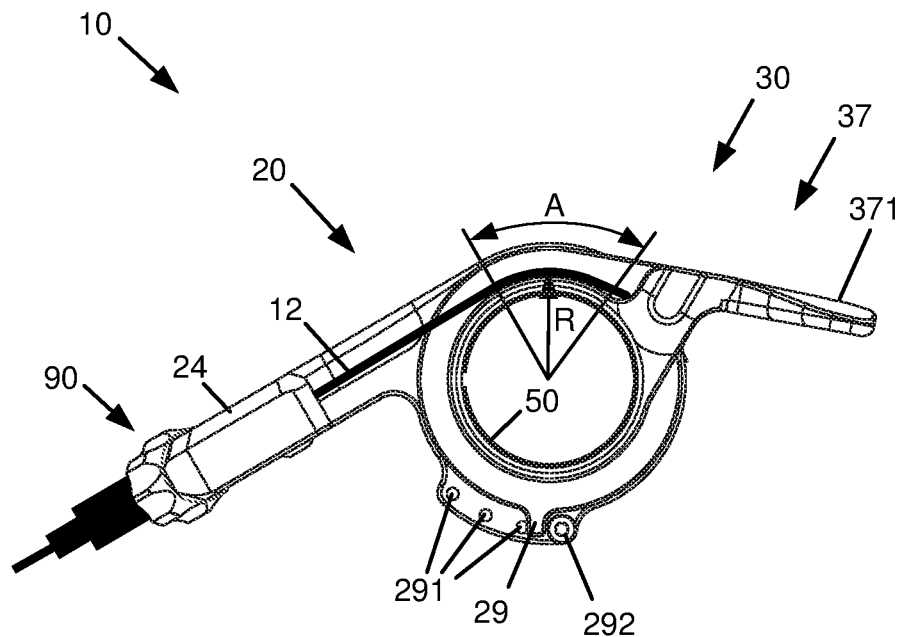
FIG. 5A is a side view of an example of the control device of FIGS. 3 and 4 in an unactuated state.
Figure 5B:
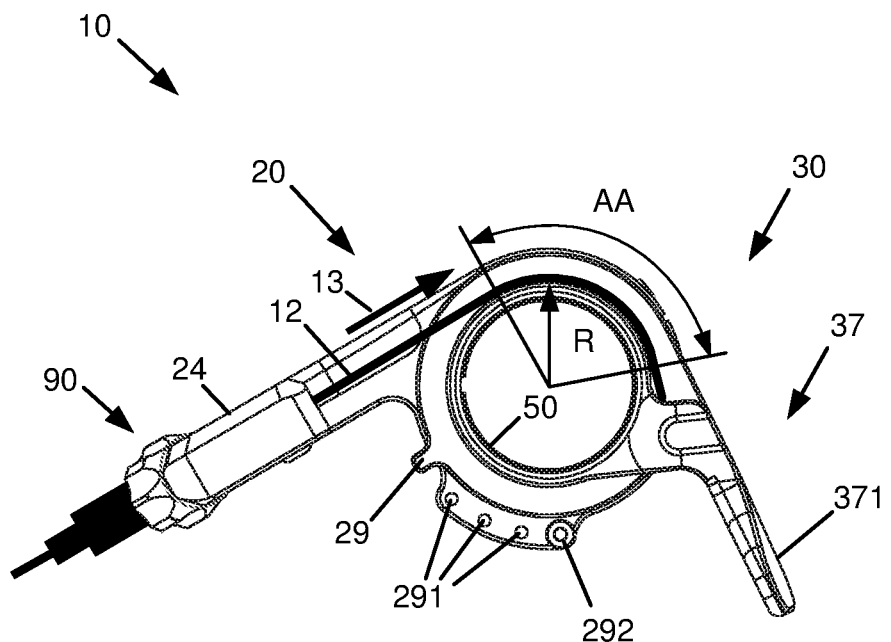
FIG. 5B is a side view of an example of the control device of FIG. 5A in an actuated state.

FIG. 5A is a side view of an example of control device 10 in an unactuated state, and FIG. 5B is a side view of an example of control device 10 in an actuated state. As illustrated in the examples of FIGS. 5A and 5B, an actuation or control cable 12 is fed through cable guide 24 of base 20 (including, in one implementation, through barrel adjuster 90), and routed along cable channel or groove 34 (FIG. 1) and into or through cable passage 36 (FIG. 1), such that an end portion of actuation or control cable 12 is captured or secured to actuation lever 30, for example, by set screw 80 (FIG. 1).

As illustrated in the example of FIG. 5A, actuation lever 30 and, therefore, control device 10, is in an unactuated (or neutral) state such that pull is not applied to actuation or control cable 12. As illustrated in the example of FIG. 5B, actuation lever 30 and, therefore, control device 10, is in an actuated state such that pull is applied to actuation or control cable 12, as represented by arrow 13. More specifically, in the example of FIG. 5B, actuation lever 30 is rotated relative to base 20 about axle 50 via bearing 40 (FIGS. 1, 2) to pull actuation or control cable 12. Actuation lever 30 is rotated, for example, by contact with a contact surface 371 of lever portion 37 (see also FIG. 1). Contact with contact surface 371 of lever portion 37 may be established or provided, for example, by a thumb (e.g., left thumb) of a user.

As illustrated in the example of FIG. 5A, in the unactuated (or neutral) state, control device 10 has a contact or wrap angle A (as a measurement of a length of actuation or control cable 12 routed within cable channel or groove 34). In one implementation, wrap angle A represents a minimum contact or wrap angle of control device 10.

As illustrated in the example of FIG. 5B, in the actuated state, control device 10 has a contact or wrap angle AA (as a measurement of a length of actuation or control cable 12 routed within cable channel or groove 34). In one implementation, wrap angle AA represents a maximum contact or wrap angle AA of control device 10. As such, in one implementation, the minimum contact or wrap angle A and the maximum contact or wrap angle AA define or establish a total lever actuation range of control device 10.

In one implementation, as illustrated in the examples of FIGS. 5A and 5B, actuation lever 30 has a contact or wrap radius R (as measured from a center of axle 50 to cable channel or groove 34) in a range of approximately 8 mm to approximately 15 mm. In one implementation, wrap radius R represents a minimum contact or wrap radius of control device 10 and is approximately 12 mm. In addition, in one implementation, bearing 40 has an outer diameter in a range of approximately 25 mm to approximately 40 mm and an inner diameter in a range of approximately 20 mm to approximately 30 mm. In one implementation, bearing 40 has an outer diameter of approximately 32 mm and an inner diameter of approximately 25 mm. As such, in one implementation, contact or wrap radius R is less than a radius of an outer diameter of bearing 40. In addition, in one implementation, a diameter of outer diameter surface 35 (in which cable channel or groove 34 is formed) is less than an outer diameter of bearing 40.

Figure 6A:
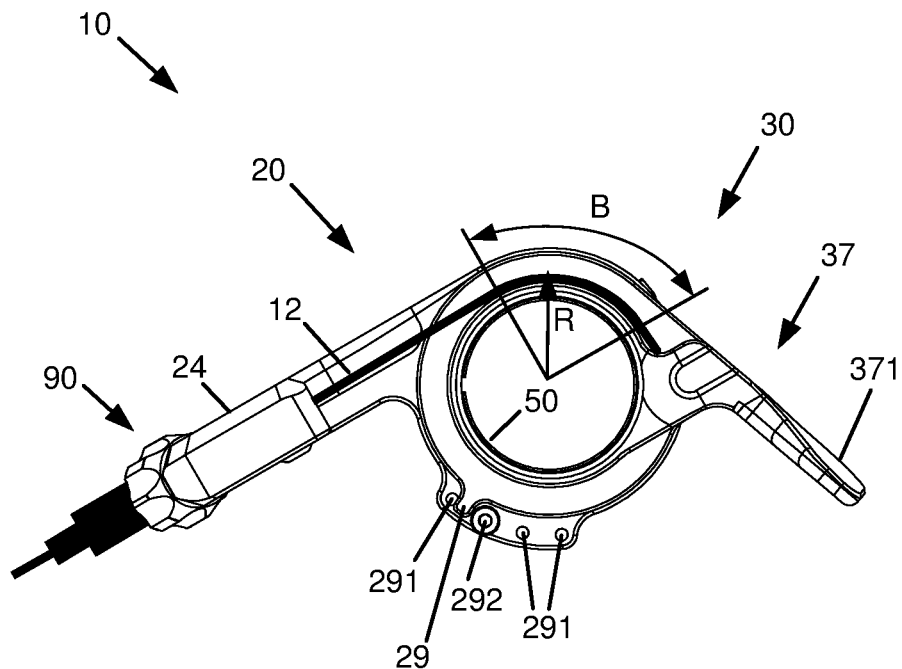
FIG. 6A is a side view of an example of the control device of FIGS. 3 and 4 in another unactuated state.
Figure 6B:
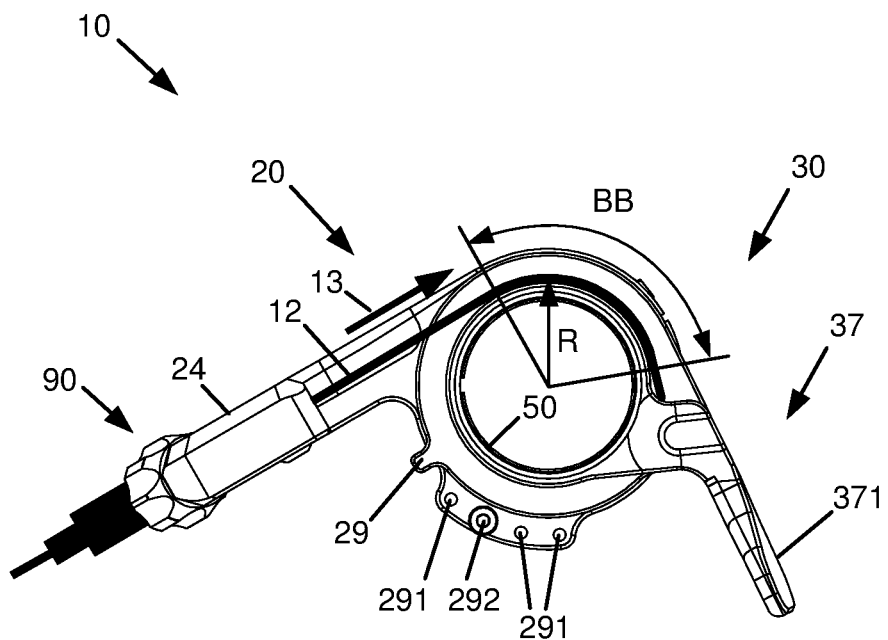
FIG. 6B is a side view of an example of the control device of FIG. 6A in an actuated state.

FIG. 6A is a side view of an example of control device 10 in an another unactuated state, and FIG. 6B is a side view of an example of control device 10 in an actuated state. As illustrated in the examples of FIGS. 6A and 6B, and similar to the examples of FIGS. 5A and 5B, an actuation or control cable 12 is fed through cable guide 24 of base 20 (including, in one implementation, through barrel adjuster 90), and routed along cable channel or groove 34 (FIGS. 1, 2) and into or through cable passage 36, such that an end portion of actuation or control cable 12 is captured or secured to actuation lever 30, for example, by set screw 80.

As illustrated in the examples of FIGS. 6A and 6B, however, a rotational starting position of actuation lever 30 is different than the rotational starting position of actuation lever 30 in the examples of FIGS. 5A and 5B. More specifically, stop 29 of base 20 is established at a different position. For example, screw 292 is positioned within a different hole of the series of holes 291 formed in the face of base 20. As such, a different rotational limit (e.g., different starting position) of actuation lever 30 (and, therefore, different rotational actuation range of control device 10) is established. Accordingly, as illustrated in the example of FIG. 6A, in the unactuated (or neutral) state, control device 10 has a contact or wrap angle B that is different from (e.g., less than) the contact or wrap angle A as illustrated in the example of FIG. 5A.

As illustrated in the example of FIG. 6B, in the actuated state, control device 10 has a contact or wrap angle BB that is approximately (substantially) the same as the contact or wrap angle AA as illustrated in the example of FIG. 5B. As such, in one implementation, a total lever actuation range of control device 10 as illustrated in the examples of FIGS. 6A and 6B is different from (e.g., less than) the total lever actuation range of control device 10 as illustrated in the examples of FIGS. 5A and 5B. In other implementations, a rotational starting position of actuation lever 30 may be different from the rotational starting position of actuation lever 30 as illustrated in the examples of FIGS. 5A and 5B and the examples of FIGS. 6A and 6B. In addition, in other implementations, a total lever actuation range of control device 10 may be different from (e.g., less than or greater than) the total lever actuation range of control device 10 as illustrated in the examples of FIGS. 5A and 5B and the examples of FIGS. 6A and 6B.

Figure 7A:
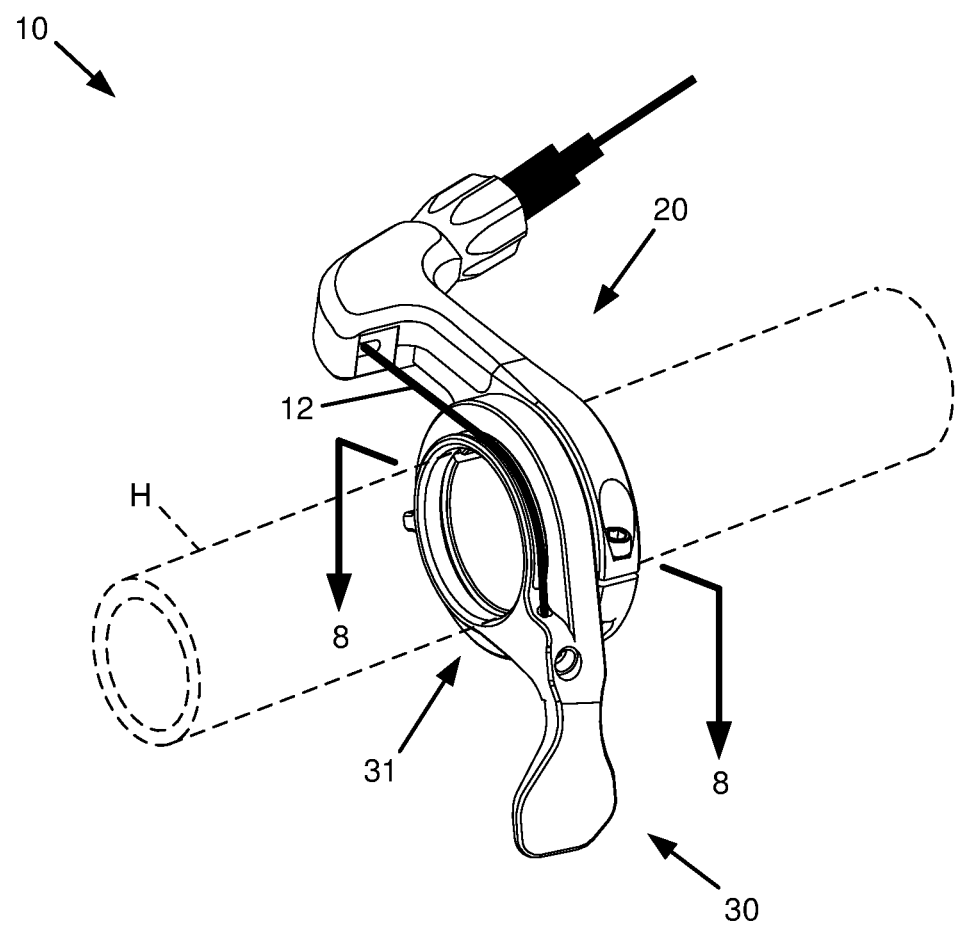
FIG. 7A is a top perspective view of an example of the control device of FIGS. 3 and 4 in an unactuated state.
Figure 7B:
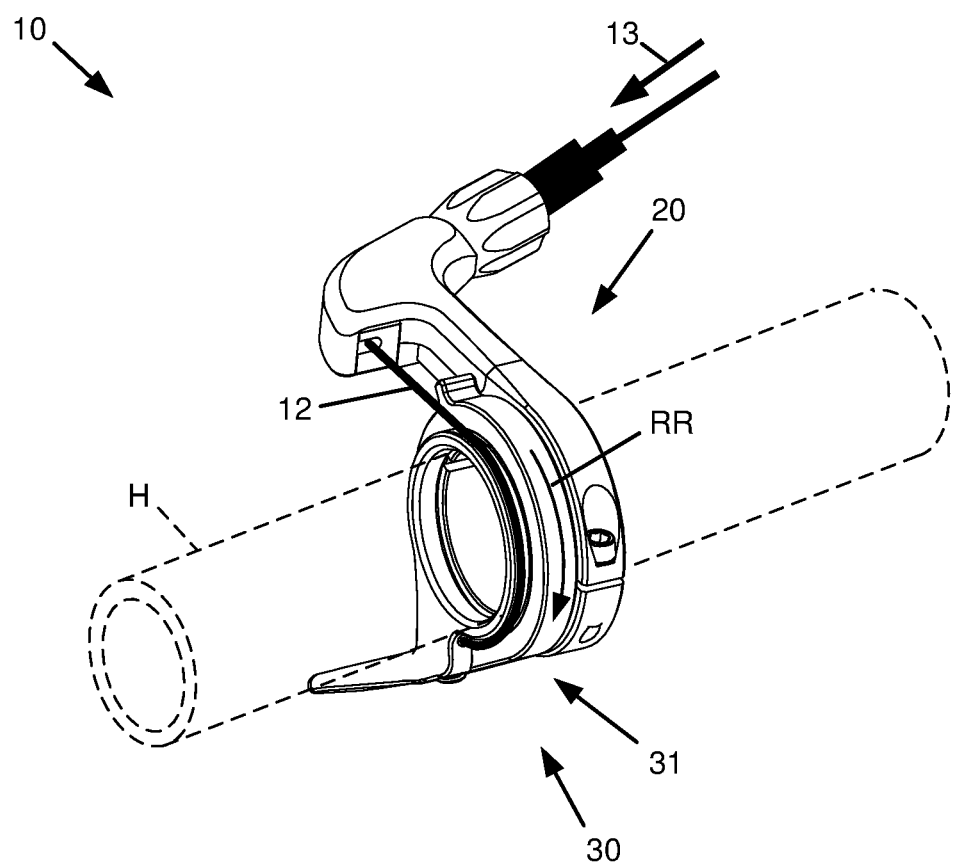
FIG. 7B is a top perspective view of an example of the control device of FIG. 7A in an actuated state.

FIG. 7A is a top perspective view of an example of control device 10 in an unactuated state, and FIG. 7B is a top perspective view of control device 10 in an actuated state. In one implementation, as illustrated in the examples of FIGS. 7A and 7B, control device 10 is mounted on a bar, such as a handlebar of a bicycle. More specifically, control device 10 is mounted on a handlebar H (as represented by broken lines) such that base 20, body portion 31 of actuation lever 30, bearing 40 (FIGS. 1, 2), and axle 50 (FIGS. 1, 2) all encircle handlebar H. As such, between the unactuated state illustrated in the example of FIG. 7A and the actuated state illustrated in the example of FIG. 7B, actuation lever 30, via bearing 40 and axle 50 (FIGS. 1, 2), rotates around (at least partially around) handlebar H relative to base 20, as represented by arrow RR. As such, pull, as represented by arrow 13, is applied to actuation or control cable 12, as routed through base 20 and secured to actuation lever 30, as disclosed herein.

Figure 8A:
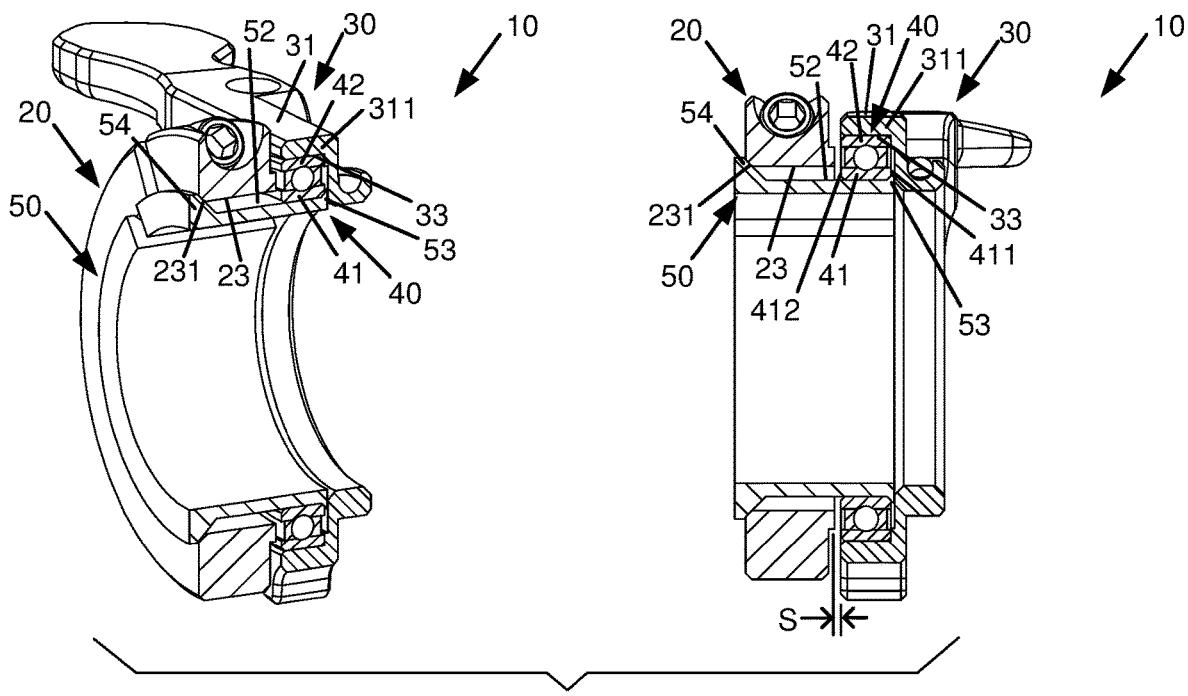
FIG. 8A includes perspective and elevation cross-sectional views of an example of the control device of FIGS. 3 and 4 in an unclamped state.
Figure 8B:
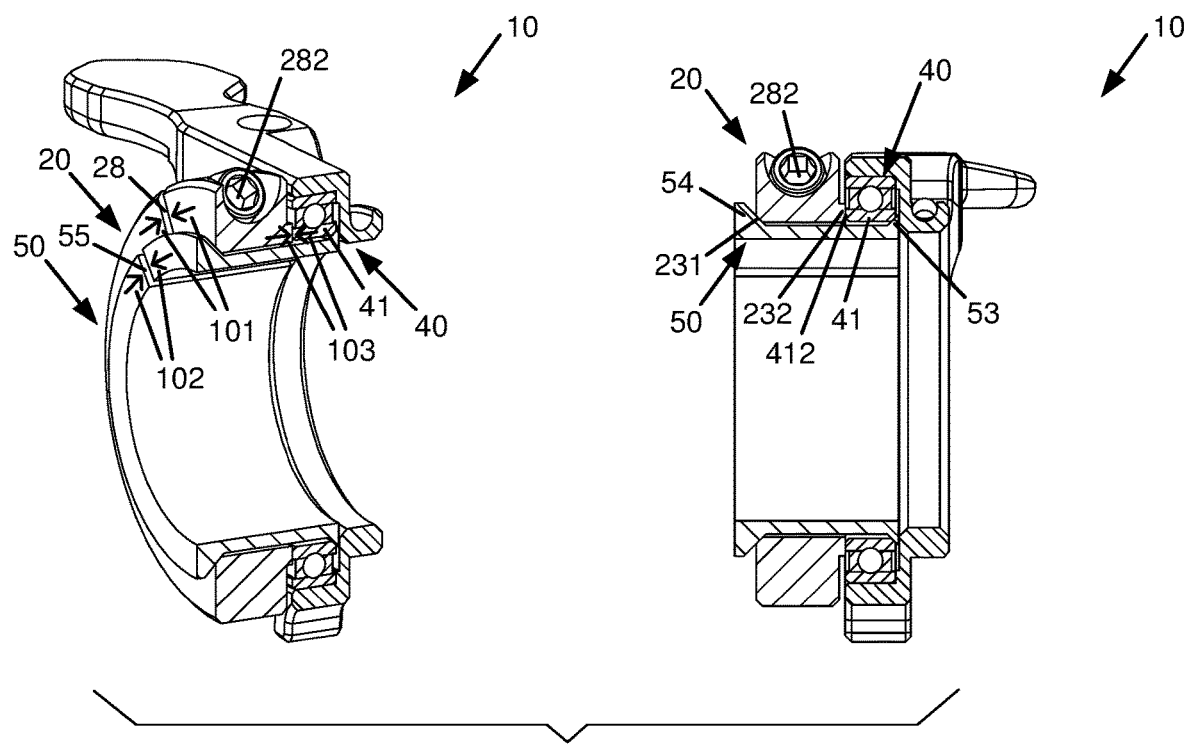
FIG. 8B includes perspective and elevation cross-sectional views of an example of the control device of FIG. 8A in a clamped state.

FIG. 8A includes perspective and elevation cross-sectional views of an example of control device 10 in an unclamped state, and FIG. 8B includes perspective and elevation cross-sectional views of an example of control device 10 in a clamped state. More specifically, FIGS. 8A and 8B include perspective and elevation cross-sectional views of control device 10 from the perspective of line 8-8 of FIG. 7A. As illustrated in the examples of FIGS. 8A and 8B, bearing 40 is mounted (e.g., press fit) within body portion 31 of actuation lever 30 including, more specifically, within bearing receiving or supporting portion 311, such that outer race 42 of bearing 40 contacts inner diameter surface 33 of body portion 31. In addition, axle 50, namely, a portion or one end thereof, is extended through bearing 40 such that outer diameter surface 52 of axle 50 contacts inner race 41 of bearing 40 and flange 53 of axle 50 contacts an end or face 411 of inner race 41 of bearing 40, whereby bearing 40 is supported by or on axle 50. Furthermore, axle 50, namely, an opposite portion or opposite end thereof, is extended into or through base 20 such that outer diameter surface 52 of axle 50 faces inner diameter surface 23 of base 20 and, in one implementation, flange 54 of axle 50 contacts chamfered edge 231, whereby base 20 is supported by or on axle 50. Actuation lever 30, with bearing 40 mounted therein, therefore, is rotatably coupled with base 20, via bearing 40 and axle 50, for rotation relative to base 20.

As illustrated in the example of FIG. 8B, when pinch bolt or screw 282 is tightened, base 20 is compressed radially such that split 28 is reduced, as represented by arrows 101. In addition, as base 20 is compressed radially, axle 50 is compressed radially such that split 55 is reduced, as represented by arrows 102. As such, as axle 50 is compressed radially, control device 10 may be secured (i.e., clamped) on a bar, such as handlebar H (FIGS. 7A, 7B).

As illustrated in the example of FIG. 8A, in an unclamped state, a small amount of play or spacing S may exist between base 20 and bearing 40. In one implementation, flanges 53 and 54 of axle 50 are chamfered flanges such that when pinch bolt or screw 282 is tightened, in addition to base 20 and axle 50 being compressed radially, base 20 and bearing 40 are compressed axially. More specifically, as base 20 is compressed radially, chamfered edge 231 of base 20 interacts with (i.e., contacts and slides along) flange 54. As such, with flange 53 of axle 50 in contact with inner race 41 of bearing 40, interaction of chamfered edge 231 with flange 54 slides or moves base 20 toward bearing 40 such that base 20 and bearing 40 are compressed axially, as represented by arrows 103. In one implementation, base 20 and bearing 40 are compressed axially such that stepped or raised edge 232 of base 20 contacts face 412 of inner race 41 of bearing 40. Thus, as illustrated in the example of FIG. 8B, in a clamped state, play or spacing S between base 20 and bearing 40 is reduced or (substantially) eliminated.

Figure 9:
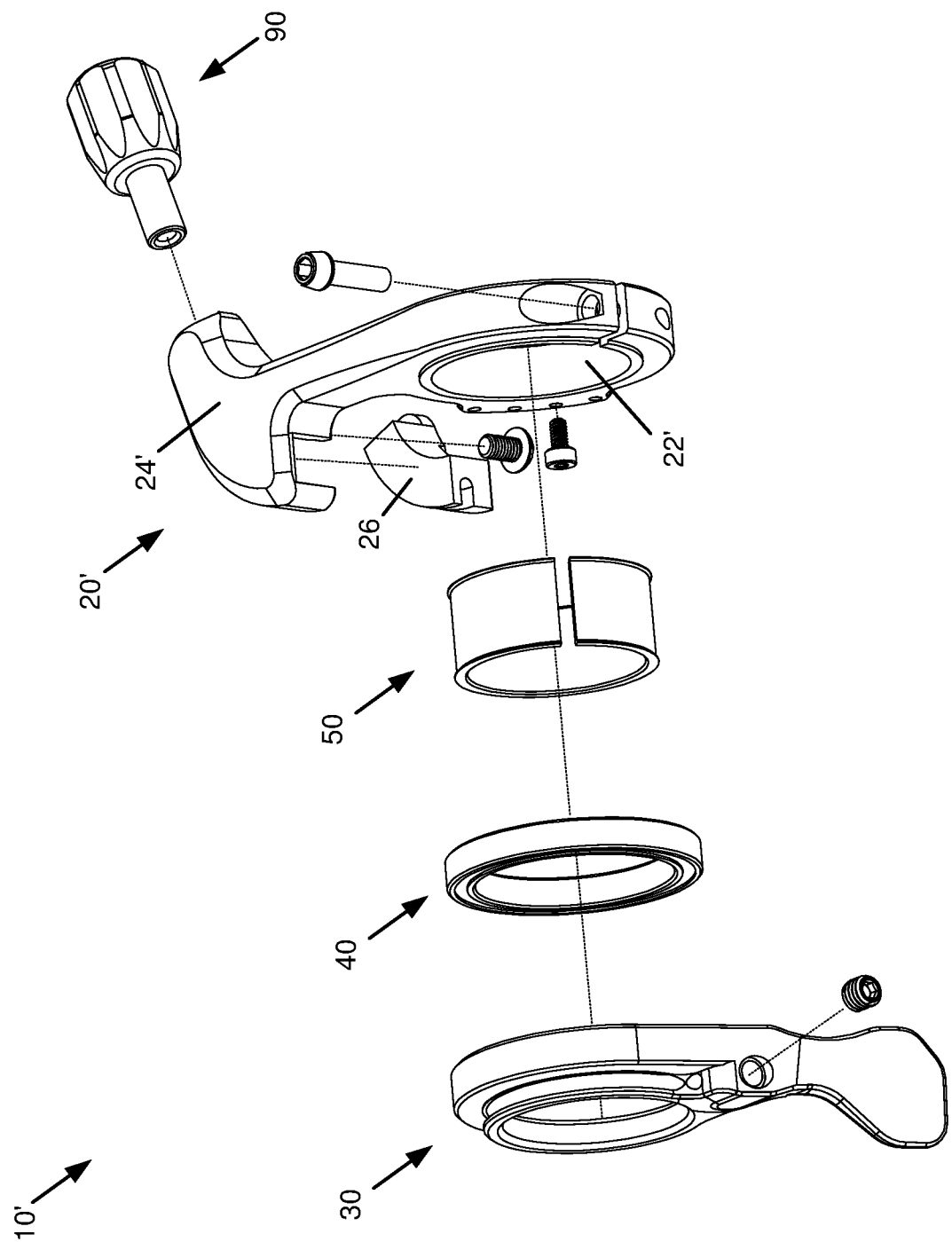
FIG. 9 is an exploded top perspective view of another example of a control device in accordance with the present disclosure.

FIG. 9 is an exploded top perspective view of another example of a control device in accordance with the present disclosure. Similar to control device 10, control device 10' includes actuation lever 30, bearing 40, and axle 50. Control device 10', however, includes a body or base 20', as another example of body or base 20, with a cable guide 24', as another example of cable guide 24. Similar to base 20, base 20' has a hole 22' therethrough and, similar to cable guide 24, cable guide 24' includes cable guide insert 26. As illustrated in the example of FIG. 9, however, cable guide 24' is integrally formed with base 20' such that base 20' with cable guide 24' is a one-piece, unitary member, component or structure.

Figure 10:
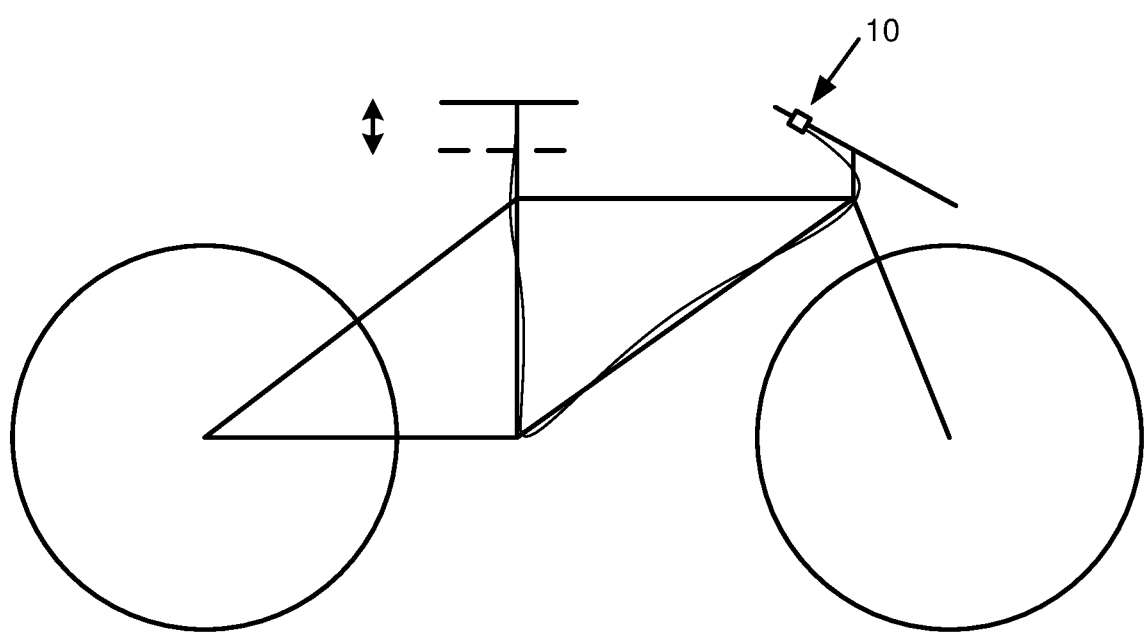
FIG. 10 is a schematic view illustrating an example implementation of a control device in accordance with the present disclosure.

In one implementation, as schematically illustrated in the example of FIG. 10, control device 10 (including control device 10') is used to control or actuate a height adjustment device for a saddle of a bicycle. More specifically, control device 10 (including control device 10') may be mounted on a bicycle (e.g., a handlebar of a bicycle), such that operation or actuation of control device 10 may be used to apply pull to an actuation or control cable coupled with a height adjustment device for a saddle of a bicycle. Although the disclosed control device is illustrated and described as being used to control or actuate a height adjustment device for a saddle of a bicycle, the disclosed control device may be used to control or actuate other cable-actuated or cable-controlled elements, components, systems, structures, or devices.

Although illustrated as a left-actuated control device, control device 10 may be implemented as a right-actuated control device wherein components of control device 10 are mirrored about a rotational axis of control device 10.

A control device as disclosed herein provides for improved operation and actuation or control of a cable-actuated or cable-controlled element, component, system, structure, or device. For example, by supporting an actuation lever on a bearing as disclosed herein, smoother operation and actuation is provided.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A control device, comprising:
an actuation lever;
a bearing mounted in the actuation lever;
an axle extended through the bearing; and
a base supported by the axle,
the actuation lever rotatably coupled with the base, via the bearing and the axle, for rotation relative to the base,
the actuation lever, the bearing, the axle, and the base to encircle a bar, and the actuation lever, via the bearing, to be at least partially rotated around the bar.

2. The control device of claim 1, the axle to be compressed radially to secure the control device on the bar.

3. The control device of claim 2, the base to be compressed radially to radially compress the axle.

4. The control device of claim 1, the bearing having an inner race, an outer diameter surface of the axle to contact the inner race of the bearing.

5. The control device of claim 1, the bearing having an outer race, the outer race of the bearing to contact an inner diameter surface of the actuation lever.

6. The control device of claim 1, the base including a clocking arrangement to establish different rotational limits of the actuation lever.

7. The control device of claim 6, the clocking arrangement comprising a stop extended from the base and a protrusion extended from the actuation lever, the stop to be moved to different positions to establish the different rotational limits of the actuation lever.

8. The control device of claim 1, the actuation lever including a body portion having a hole therethrough and a lever portion extended from the body portion, the bearing mounted within the body portion.

9. The control device of claim 8, the body portion of the actuation lever including a bearing supporting portion to support the bearing and a cable supporting portion formed laterally of the bearing supporting portion to support a control cable, a diameter of the cable supporting portion being less than a diameter of the bearing supporting portion.

10. A control device, comprising:
an axle;
a base supported by the axle;
a bearing supported by the axle; and
an actuation lever supported by the axle via the bearing, the actuation lever to be rotated relative to the base about the axle via the bearing,
the axle comprising a split, tension bushing.

11. The control device of claim 10, the base to be compressed radially to secure the control device on a bar.

12. The control device of claim 11, the axle to be compressed radially as the base is compressed radially.

13. The control device of claim 11, the base and the bearing to be compressed axially as the base is compressed radially.

14. The control device of claim 10, the bearing having an inner race and an outer race, an edge of the base to contact the inner race of the bearing.

15. The control device of claim 10, the base including a rotational limit to establish different rotational starting positions of the actuation lever.

16. A control device, comprising:
a base;
an actuation lever;
a bearing mounted in the actuation lever; and
an axle extended into the base and through the bearing,
the actuation lever supported on the axle by the bearing for rotation relative to the base,
the base to be compressed radially to radially compress the axle and axially compress the base and the bearing.

17. The control device of claim 16, the base, the actuation lever, the bearing, and the axle to encircle a bar, and the actuation lever, via the bearing, to be at least partially rotated around the bar.

18. The control device of claim 16, the axle comprising a cylindrical bushing including flanges at opposite ends.

19. The control device of claim 18, one of the flanges to contact the base and another of the flanges to contact the bearing.

20. The control device of claim 19, the base to slide along the one of the flanges to move the base toward the bearing.

21. The control device of claim 16, the actuation lever including a body portion having a hole therethrough and a lever portion extended from the body portion, the bearing mounted within the body portion.

22. The control device of claim 21, the body portion of the actuation lever including a channel to support a control cable, a radius of the channel being less than an outside radius of the bearing.

23. A control device, comprising:
a base;
an actuation lever;

a bearing mounted in the actuation lever; and an axle extended into the base and through the bearing, the actuation lever supported on the axle by the bearing for rotation relative to the base, the axle comprising a cylindrical bushing including flanges at opposite ends.

24. The control device of claim 23, one of the flanges to contact the base and another of the flanges to contact the bearing.

25. The control device of claim 24, the base to slide along the one of the flanges to move the base toward the bearing.

26. The control device of claim 23, the actuation lever including a body portion having a hole therethrough and a lever portion extended from the body portion, the bearing mounted within the body portion.

27. The control device of claim 26, the body portion of the actuation lever including a channel to support a control cable, a radius of the channel being less than an outside radius of the bearing.

28. The control device of claim 23, the base, the actuation lever, the bearing, and the axle to encircle a bar, and the actuation lever, via the bearing, to be at least partially rotated around the bar.

29. The control device of claim 23, the base to be compressed radially to radially compress the axle and axially compress the base and the bearing.

\* \* \* \* \*